United States Patent
Foreman et al.

(10) Patent No.: US 11,074,386 B2
(45) Date of Patent: *Jul. 27, 2021

(54) METHOD OF PARAMETER CREATION (71) Applicant: INTERNATIONAL BUSINESS MACHINES CORPORATION, Armonk, NY (US)

(72) Inventors: Eric Foreman, Fairfax, VT (US); Ning Lu, Essex Junction, VT (US); Jeffrey Hemmett, St. George, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,719

(22) Filed: Aug. 6, 2019

(65) Prior Publication Data
US 2019/0362046 A1 Nov. 28, 2019

Related U.S. Application Data

(63) Continuation of application No. 15/623,549, filed on Jun. 15, 2017, now Pat. No. 10,409,938.

(51) Int. Cl.
*G06F 30/367* (2020.01)
*G06F 30/30* (2020.01)
(Continued)

(52) U.S. Cl.
CPC ............ *G06F 30/367* (2020.01); *G06F 17/18* (2013.01); *G06F 30/30* (2020.01); *G06F 2111/08* (2020.01)

(58) Field of Classification Search
CPC ...... G06F 17/18; G06F 2111/08; G06F 30/30; G06F 30/367; G06F 17/5036; G06F 17/5045; G06F 111/08
See application file for complete search history.

(56) References Cited

U.S. PATENT DOCUMENTS 6,018,623 A 1/2000 Chang et al.
6,304,836 B1 10/2001 Krivokapic et al.
(Continued)

FOREIGN PATENT DOCUMENTS

WO 2008153667 A2 12/2008

OTHER PUBLICATIONS

IBM: List of IBM Patents or Patent Applications Treated as Related (Appendix P), Aug. 1, 2019, 2 pages.
(Continued)

*Primary Examiner* — Vuthe Siek
(74) *Attorney, Agent, or Firm* — Robert D. Bean (57) ABSTRACT

According to one embodiment, a method, computer system, and computer program product for creating a plurality of process parameters in a circuit design is provided. The present embodiment of the invention may include receiving one parasitic extraction per layer of a circuit is used to obtain a resistance base factor and a capacitance base factor. The embodiment may further include performing Monte Carlo simulations to determine distributions of capacitance and resistance for each metal layer of the circuit, and creating scalars that scale each of the resistance base factor and the capacitance base factor to a minimum and maximum process limit. Additionally, the embodiment may include defining at least one delay corner using the created scalars, and receiving the results of one or more timing analyses performed using the resistance base factor and the capacitance base factor, and the defined delay corner to determine a delay variability per layer.

17 Claims, 7 Drawing Sheets

(51) Int. Cl.
*G06F 17/18* (2006.01)
*G06F 111/08* (2020.01)

(56) References Cited

U.S. PATENT DOCUMENTS

| | | | |
|---|---|---|---|
| 7,290,232 | B1 | 10/2007 | Fung et al. |
| 7,383,521 | B2 | 6/2008 | Smith et al. |
| 7,650,580 | B2 | 1/2010 | Kucukcakar et al. |
| 8,005,660 | B2 | 8/2011 | Chiu et al. |
| 8,271,256 | B2 | 9/2012 | Khalily et al. |
| 8,924,905 | B1 | 12/2014 | Keller et al. |
| 2005/0132306 | A1 | 6/2005 | Smith et al. |
| 2007/0226671 | A1 | 9/2007 | Hirata |
| 2008/0028353 | A1 | 1/2008 | Lu et al. |
| 2008/0243414 | A1* | 10/2008 | Oh .................. G06F 30/39 702/85 |
| 2009/0276744 | A1* | 11/2009 | Akutsu ............ G06F 30/3312 716/113 |
| 2014/0189634 | A1* | 7/2014 | Tsai .................. G06F 30/327 716/134 |
| 2014/0351779 | A1 | 11/2014 | Ren et al. |
| 2016/0154918 | A1 | 6/2016 | Li et al. |
| 2018/0365360 | A1 | 12/2018 | Foreman et al. |

OTHER PUBLICATIONS

Mell et al., "The NIST Definition of Cloud Computing," National Institute of Standards and Technology, Sep. 2011, p. 1-3, Special Publication 800-145.

Singhee, et al., "Practical, Fast Monte Carlo Statistical Static Timing Analysis: Why and How", Published in: Computer-Aided Design, 2008, ICCAD 2008, IEEE/ACM International Conference on Nov. 10-13, 2008, pp. 1-6.

Pending U.S. Appl. No. 16/385,420, filed Apr. 16, 2019, entitled: "Method of Parameter Creation", 31 pages.

Foreman, et al., "Method of Parameter Creation," Application and Drawings, Filed on Sep. 11, 2017, 41 Pages, Related U.S. Appl. No. 15/700,230.

* cited by examiner

METHOD OF PARAMETER CREATION

BACKGROUND

The present invention relates, generally, to the field of computing, and more particularly to the field of digital integrated circuit design.

Integrated circuits are a family of electronic circuits which incorporate large numbers of tiny transistors printed onto small semiconductor wafers. Compared to traditional circuits, which are composed of discrete electronic components, integrated circuits are orders of magnitude smaller, cheaper, faster, and more reliable. Furthermore, integrated circuits lend themselves well to mass production and building-block circuit design. As a result, integrated circuits are now found in almost every modern electronic device. Consequently, the process of designing integrated circuits has become of utmost importance to the advancement of computing and consumer electronics. A significant challenge is accounting for metal variation in circuit designs; metal variation is the naturally occurring variation in the attributes of metals when they are created. These variations are becoming more pronounced as technology progresses; as wires become smaller, resistance increases, and manufacturing flaws are more likely. Furthermore, as designs of each circuit become more complex, a larger metal stack or more layers are required to route all the signals, which magnifies the aggregate effects of variations. Current methods, such as parasitic extraction, attempt to take into account all possible conditions to produce the metal variation, which requires a large amount of input data and can be extremely resource-intensive.

SUMMARY

According to one embodiment, a method, computer system, and computer program product for creating a plurality of process parameters in a circuit design is provided. The present embodiment of the invention may include receiving, from a parasitic extractor, one parasitic extraction per layer of a circuit is used to obtain a resistance base factor and a capacitance base factor. The embodiment may further include performing up-front Monte Carlo simulations to determine distributions of capacitance and resistance for each metal layer of the circuit, and creating scalars that scale each of the resistance base factor and the capacitance base factor to a minimum process limit and a maximum process limit. Additionally, the embodiment may include defining at least one delay corner using the created scalars, and receiving, from a timing engine, the results of one or more timing analyses performed using the resistance base factor and the capacitance base factor, and the defined at least one delay corner to determine a delay variability per layer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the field of digital circuit design. The following described exemplary embodiments provide a system, method, and program product to, among other things, abstract the variational parameters down to a single input through a single parasitic extraction step and the use of Monte Carlo simulations to create per layer resistive and capacitive scalars, and use these scalars in a timing engine to compute the delay. Therefore, the present embodiment has the capacity to improve the technical field of digital circuit design by eliminating the need for multiple costly parasitic extractions and numerous inputs for a timing analysis, thereby reducing the difficulty, complexity and resource-intensity of the process of determining metal process variation.

As previously described, integrated circuits are a family of electronic circuits which incorporate large numbers of tiny transistors printed onto small chips. Compared to traditional circuits, which are composed of discrete electronic components, integrated circuits are orders of magnitude smaller, cheaper, faster, and more reliable. Furthermore, integrated circuits lend themselves well to mass production and building-block circuit design. As a result, integrated circuits are now found in almost every modern electronic device. Consequently, the process of designing integrated circuits has become of utmost importance to the advancement of computing and consumer electronics. A significant challenge is accounting for metal variation in circuit designs; metal variation is the naturally occurring variation in the attributes of metals when they are created. These variations are becoming more pronounced as technology progresses; as wires become smaller, resistance increases, and manufacturing flaws are more likely. Furthermore, as designs of each circuit become more complex, a larger metal stack or more layers are required to route all the signals, which magnifies the aggregate effects of variations.

In order to account for metal variation in a timing analysis, process variability needs to be parameterized using such methods as multi-corner timing or process variables in statistical timing; this typically requires metal characterized models for a parasitic extractor, multiple extractions to be created, and to be read into timing runs. Parasitic extraction, however, attempts to take into account all possible conditions to produce the metal variation. The parasitic extractor takes as inputs a variety of different metal wire conditions at a single process point, such as the type of metal used in the wire, what level the wire is in the circuit, how thick the wire is, how many tracks go across the segment, and what sort of environment the wire is in. The parasitic extraction takes into account all of these different possible conditions and computes the resistive and capacitive values for all the different segments; this process can therefore be extremely resource-intensive. Furthermore, each parasitic extraction only takes into account the timing changes of a single metal process, so for multiple metal processes it becomes necessary to perform multiple parasitic extractions, which increase exponentially in complexity as the number of layers, and therefore the number of combinations of layers at different process points, increases. To avoid the significant expense of multiple parasitic extractions, some in the industry perform a single extraction, and add guard band or margining to their design to account for what the variability would be at different corners. The consequences of such an approach is that the additional margin added to the design requires that circuit delay be added, which in turn necessitates that circuit buffers be added. This increases the overall area of the chip design, which in turn necessitates more dynamic and leakage power from having additional circuits on the chip. Since the additional circuits make the data paths longer, the clock must be slowed down in order to achieve the data propagation within that clock cycle. Consequently, the addition of margin has the potential to impact the clock cycle, the area of the design, and the power requirements. As such, it may be advantageous to, among other things, implement a system that accounts for metal variation without requiring input data that may not be available in a fabless design environment, and which bypasses the necessity of multiple expensive parasitic extractions, such as by performing Monte Carlo simulations to create per-layer resistive and capacitive scalars from a single extraction which can be used as inputs in a timing analysis.

According to one embodiment, the method of parameter creation may utilize Monte Carlo simulations to create per-layer resistive and capacitive scalars; these scalars represent how resistance and capacitance can change a nominal resistance and capacitance to the process distribution limits. The method further utilizes creating metal layer corners in a statistical static timing analysis which represent per-layer resistance and capacitance distribution limits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to abstract the variational parameters of a metal layer down to a single input through a single parasitic extraction step as well as through the use of Monte Carlo simulations to create per layer resistive and capacitive scalars.

Figure 1:
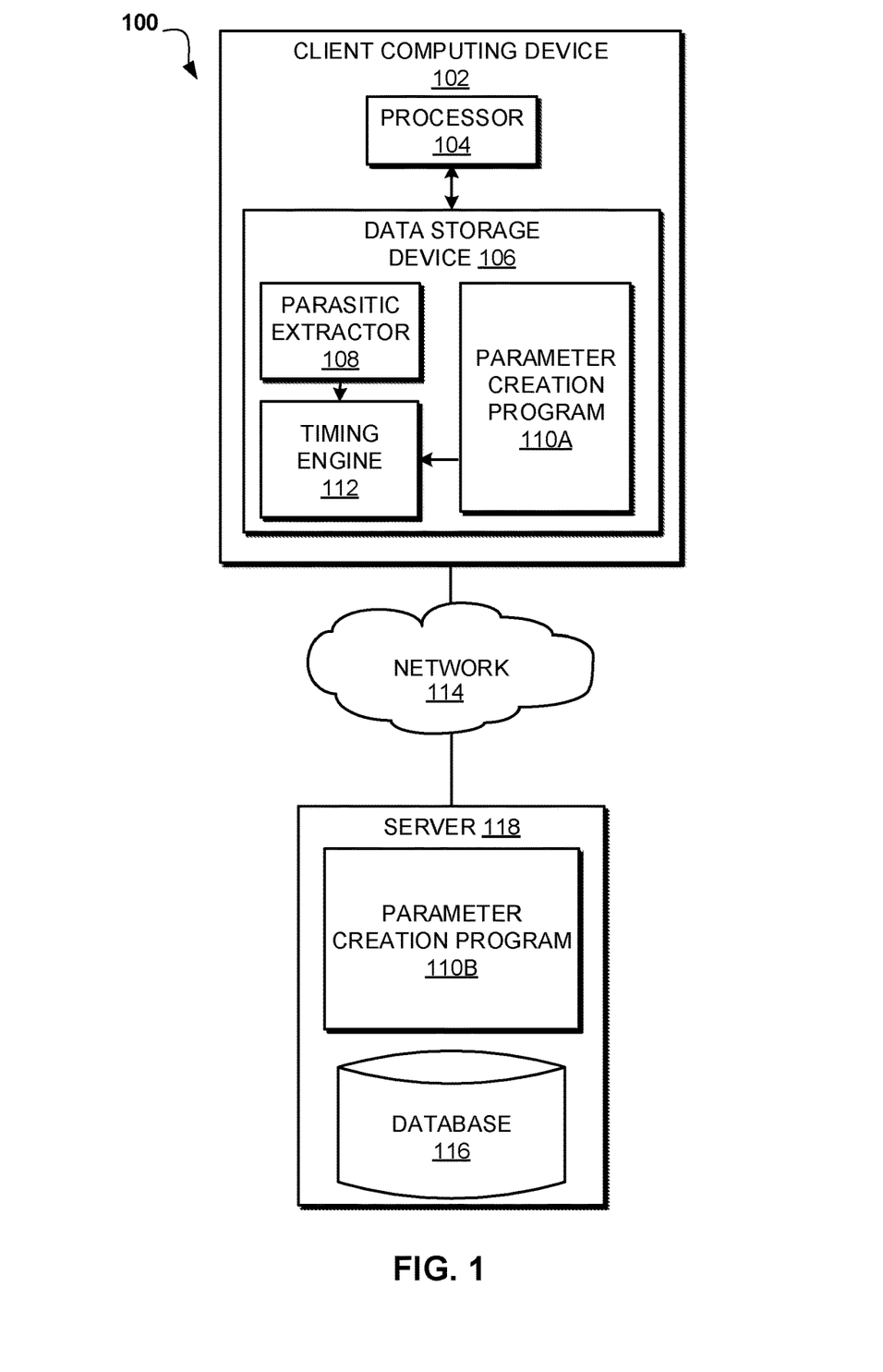
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 118 interconnected via a communication network 114. According to at least one implementation, the networked computer environment 100 may include a plurality of client computing devices 102 and servers 118, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a parasitic extractor 108, a timing engine 112, and a parameter creation program 110A and communicate with the server 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5 the client computing device 102 may include internal components 502a and external components 504a, respectively.

The server computer 118 may be a laptop computer, netbook computer, personal computer (PC), a desktop computer, or any programmable electronic device or any network of programmable electronic devices capable of hosting and running a parameter creation program 110B and a database 116 and communicating with the client computing device 102 via the communication network 114, in accordance with embodiments of the invention. As will be discussed with reference to FIG. 5 the server computer 118 may include internal components 502b and external components 504b, respectively. The server 118 may also operate in a cloud computing service model, such as Software as a Service (SaaS), Platform as a Service (PaaS), or Infrastructure as a Service (IaaS). The server 118 may also be located in a cloud computing deployment model, such as a private cloud, community cloud, public cloud, or hybrid cloud.

The parasitic extractor 108 may be one of any computer programs capable of performing a parasitic extraction, where a parasitic extraction is an accurate analog model of the integrated circuit being designed from which any parasitic effects, including parasitic capacitance and parasitic resistance, can be extracted. The parasitic extractor 108 accepts model values of various factors relating to the metal variation as inputs, including nominal wire thickness, wire width, via height above, and via height below. The parasitic extractor 108 may accept Simulation Program with Integrated Circuit Emphasis (SPICE) simulations as inputs, as well. The parasitic extractor 108 may then compute the nominal values for parasitic capacitance and resistance, and pass these values on to the timing engine 112.

The timing engine 112 may be one of any computer programs capable of performing either multi-corner or statistical static timing analysis. Examples of suitable timing engines include EinsTimer™ (EinsTimer™ and all EinsTimer™ based trademarks and logos are trademarks or registered trademarks of International Business Machines Corporation and/or its affiliates), PrimeTime® (Primetime® and all Primetime® based trademarks and logos are trademarks or registered trademarks of Synopsys, Inc. and/or its affiliates) or Tempus™ (Tempus™ and all Tempus™ based trademarks and logos are trademarks or registered trademarks of Cadence Design Systems, Inc. and/or its affiliates). The timing engine may receive, as inputs, the scalar values for capacitance and resistance from parameter creation program 110A, 110B and the nominal values for capacitance and resistance from parasitic extractor 108, compute the sensitivities of each segment in a layer, and accumulate the sensitivities of each segment and layer in the circuit to calculate the overall accumulated delay and how the overall accumulated delay changes across an n-dimensional metal layer/parameter state.

According to the present embodiment, the parameter creation program 110A, 110B may be a program capable of performing Monte Carlo simulations, creating normalized coefficients that scale nominal resistance and capacitance to their three-sigma maximum and minimum process points, defining at least two delay corners based upon nominal resistance, capacitance, and normalized coefficients, and performing a timing analysis using at least two delay corners to determine delay variability per layer. The parameter creation method is explained in further detail below with respect to FIG. 2.

Figure 2:
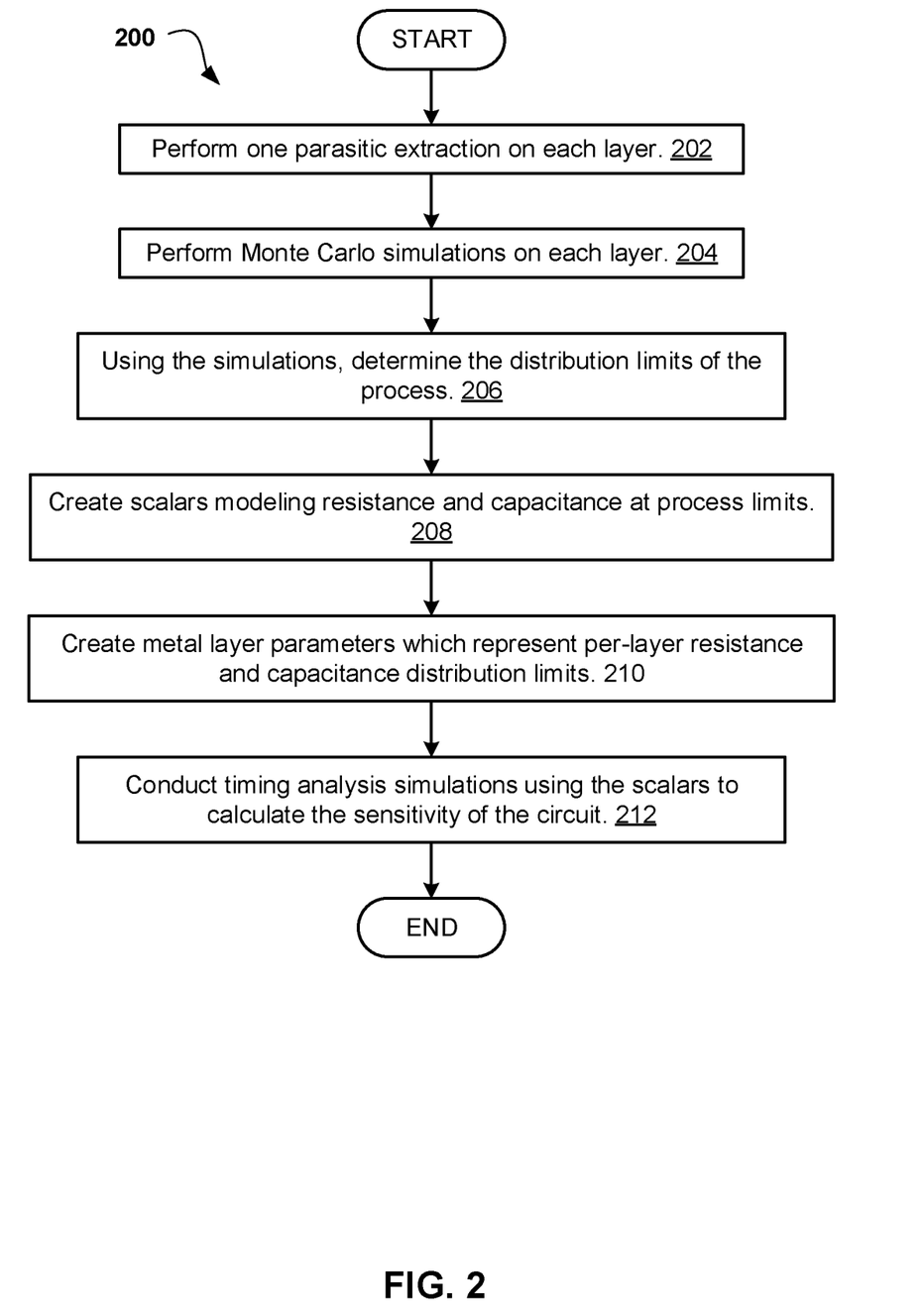
FIG. 2 is an operational flowchart illustrating a parameter creation process according to at least one embodiment.

Referring now to FIG. 2, an operational flowchart illustrating a parameter creation process 200 is depicted according to at least one embodiment. At 202, the parasitic extractor 108 performs a parasitic extraction on each layer. The parasitic extractor 108 may receive as inputs various factors relating to the metal variation, including nominal wire thickness, wire width, via height above, and via height below. The parasitic extractor 108 may then compute all the resistive and capacitive values for each segment in the layer, and from these values the parasitic extractor 108 may calculate the nominal values for resistance and capacitance for each segment. These values may be stored in a repository, such as data storage device 106 or database 116.

Figure 4:
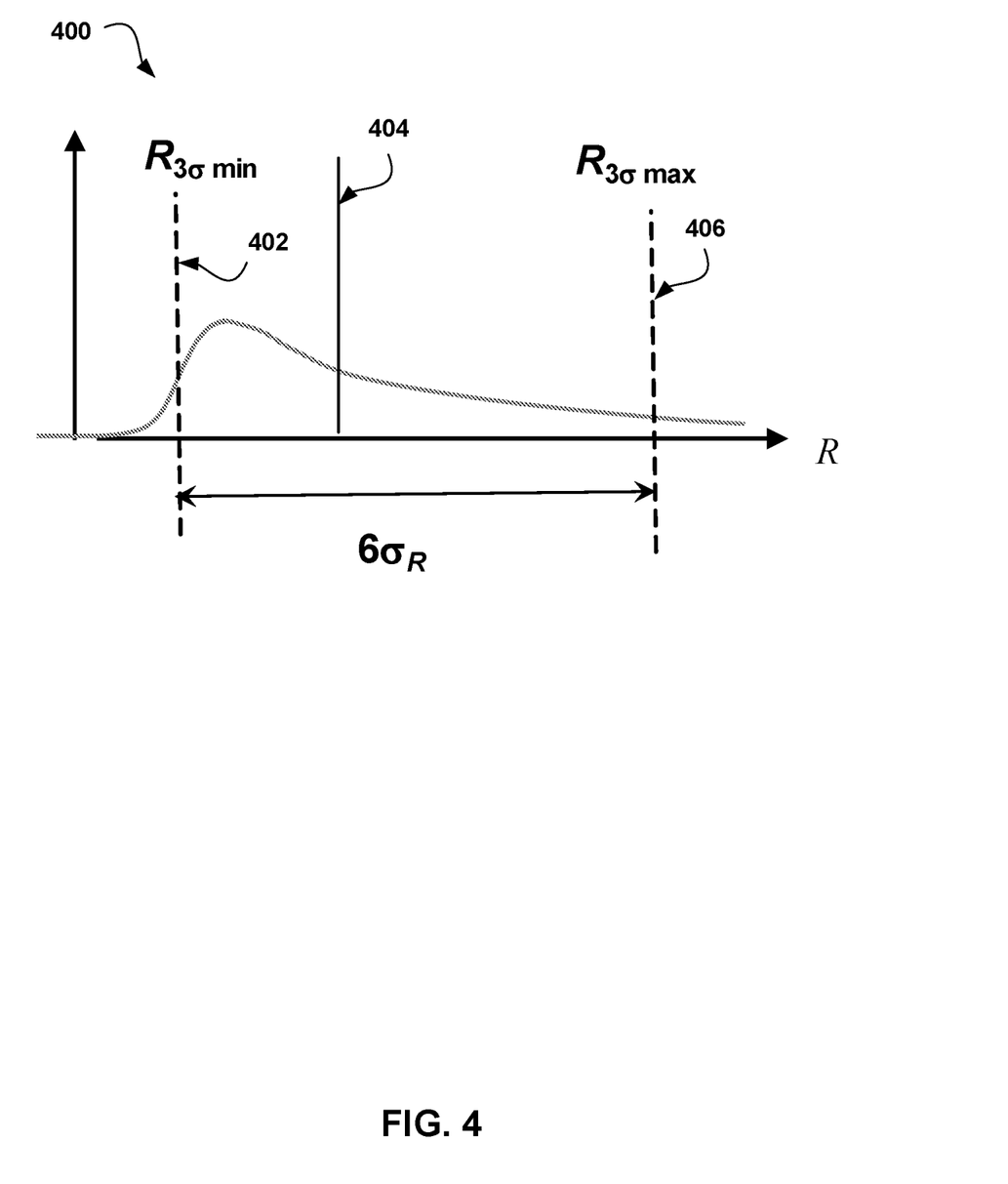
FIG. 4 illustrates a sample histogram for resistance as produced by a Monte Carlo simulation according to at least one embodiment.

Then, at 204, the parameter creation program 110A, 110B performs Monte Carlo simulations on each layer. The Monte Carlo simulation is a known computational algorithm for building models of possible results by substituting a range of values for any factor that has inherent uncertainty; here, the Monte Carlo simulations may be given multiple inputs by parameter creation program 110A, 110B, which may include model nominal and model tolerance values for wire thickness, width, via height above, via height below, and the dielectric constant of insulating materials. The Monte Carlo simulations may then construct histograms of the capacitance and resistance of each layer by plotting variations within three standard deviations of the nominal/tolerance points given as an inputs. An exemplary histogram is illustrated in FIG. 4. The number of Monte Carlo simulations performed by the parameter creation program 110A, 110B may vary, but the ability of the simulations to produce accurate results increases as the number of simulations increases; a number of simulations greater than ten thousand may therefore be desirable.

Next, at 206, parameter creation program 110A, 110B uses the simulations to determine the distribution limits of the process. Parameter creation program 110A, 110B may utilize the histograms for capacitance and resistance produced by the Monte Carlo simulations, determine the nominal point of the distributions plotted in the histograms, and place the distribution limits at three standard deviations from the nominal point in the positive and negative directions.

Then, at 208, parameter creation program 110A, 110B creates scalars modeling resistance and capacitance at the distribution limits; the lesser distribution limits of the resistance and capacitance histograms are marked as the resistance minimum and capacitance minimum, respectively. Likewise, the upper distribution limits form the resistance maximum and the capacitance maximum. Parameter creation program 110A, 110B may then create scalars for each of capacitance and resistance by taking the ratio of the process limits to the nominal values. For each layer, parameter creation program 110A, 110B may produce a ratio for each of $R_{max}$, $R_{min}$, $C_{max}$, and $C_{min}$, which are represented as $S_{R,max}$, $S_{R,min}$, $S_{C,max}$, and $S_{C,min}$, respectively. $R_{max}$ is often $R_{3\sigma,max}$, but can also be $R_{2\sigma,max}$, $R_{1\sigma,max}$, $R_{99\%,max}$, $R_{95\%,max}$, $R_{90\%,max}$, etc. $R_{min}$ is often $R_{3\sigma,min}$, but can also be $R_{2\sigma,min}$, $R_{1\sigma,min}$, $R_{1\%,max}$, $R_{5\%,max}$, $R_{10\%,max}$, etc. $C_{max}$ is often $C_{3\sigma,max}$, but can also be $C_{2\sigma,max}$, $C_{1\sigma,max}$, $C_{99\%,max}$, $C_{95\%,max}$, $C_{90\%,max}$, etc. $C_{min}$ is often $C_{3\sigma,min}$, but can also be $C_{2\sigma,min}$, $C_{1\%,max}$, $C_{5\%,max}$, $C_{10\%,max}$, etc.

Next, at 210, parameter creation program 110A, 110B creates metal layer parameters which represent per-layer resistance and capacitance distribution limits. Each parameter may have two process corners: thick and thin. The thick process corner may model timing at maximum capacitance and minimum resistance, while the thin process corner may model timing at minimum capacitance and minimum resistance. These corners may be transmitted to timing engine 112. While two process corners at thick and thin are contemplated in the exemplary embodiment, the number of process corners may also be less than or greater than two; only a single corner need be defined (that is different from what is extracted) to practice the method. Furthermore, the corners may not necessarily be at thick and thin, nor must the thick and thin corners be defined as maximum capacitance minimum resistance and vice versa, respectively; the thick and thin corners may be defined as such in the exemplary embodiment to produce the widest range, but it may be desirable to adjust this range according to design requirements or other factors. As an example, if one wanted less variability in their chip design, and were willing to give up yield of chips, one might close the chips to a tighter distribution that does not reach the maximum or minimum limits of the distribution to sacrifice functionality in favor of performance.

Then, at 212, timing engine 112 conducts timing analysis simulations using the scalars to calculate the sensitivity of the circuit. Timing engine 112 runs a small number of simulations to capture the impact of variations of such factors as wire width, wire thickness, and the via heights on the variation of signal delay; from this, timing engine 112 computes the metal delays along each path through a segment at thin and thick, and may then compute the differences between the delays to produce the sensitivity. This process is repeated for each segment in a layer that the desired path passes through, and the sensitivity of each segment is stored as a vector to produce the accumulation of the sensitivities of the layer. This process is then repeated for each metal layer to produce a vector with as many entries as metal layers, where each entry represents the accumulation of the sensitivity for each metal layer. Once the process is complete, the resultant vector may contain the overall accumulated delay and how the delay can change across the n-dimensional metal layer/metal parameter state.

Figure 3:
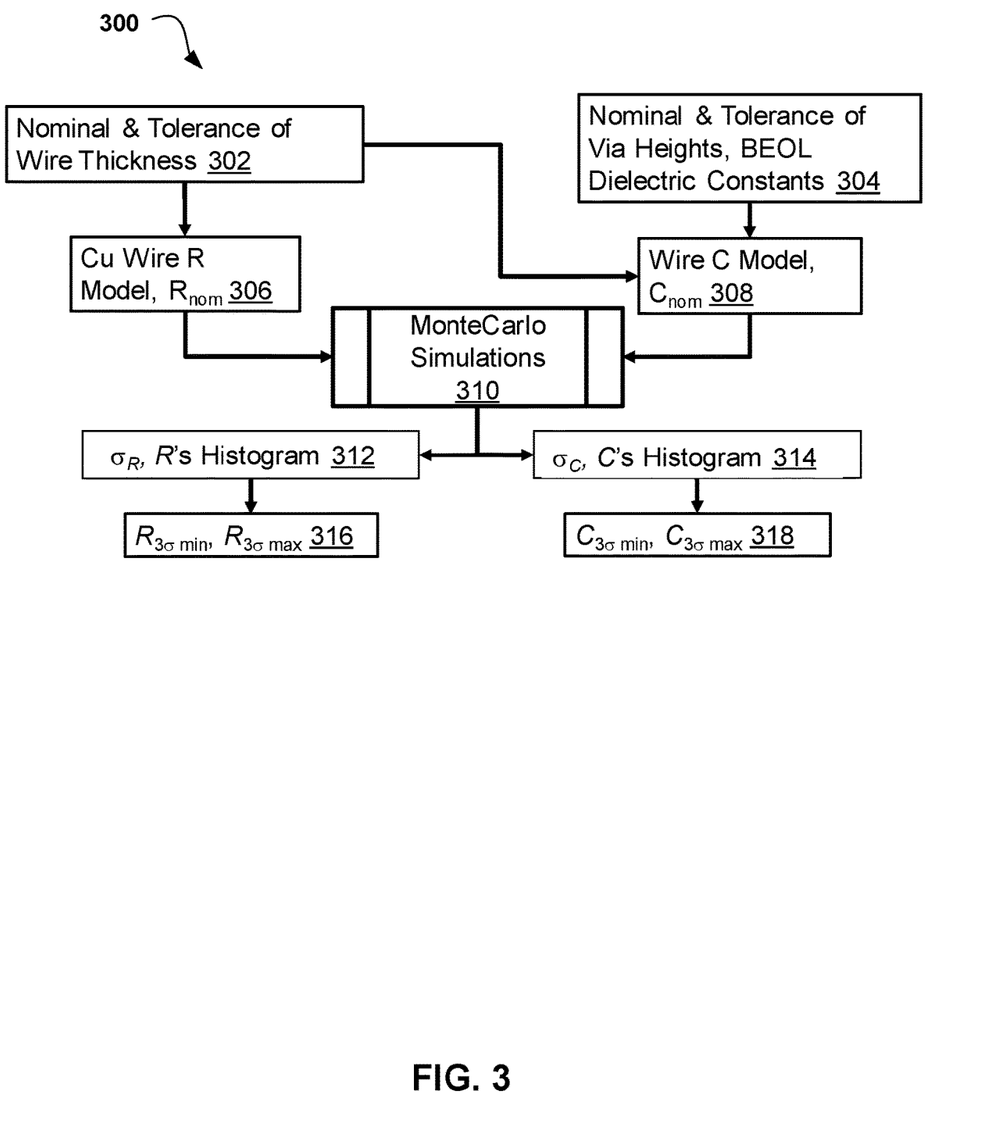
FIG. 3 illustrates a library characterization of the metal layer according to at least one embodiment.

Referring now to FIG. 3, a library characterization block diagram 300 of the metal layer is depicted according to at least one embodiment. The inputs and outputs to the Monte Carlo simulations 310 are illustrated in block diagram 300. The nominal & tolerance values for the wire thickness and the nominal & tolerance values for the wire width 302 and the nominal and tolerance values for via heights, the nominal & tolerance values for the line-to-line space and back end of line (BEOL) dielectric constants 304 are provided by the manufacturer. These nominal and tolerance values of wire thickness and wire width are input to a wire resistance model 306. From parameter values 302 and wire resistance model 306, and using Monte Carlo simulations 310, the nominal value, the standard deviation, and the histogram of the wire resistance are obtained at 312. To extract wire capacitance values, besides wire thickness and wire width 302, additional process parameters, like via height above, via height below, line-to-line space (both sides), and the dielectric constants of insulating materials between metal wires, above the metal wire, and below metal wire are needed at 304. The nominal and tolerance values of parameter values 302 and additional process parameter values 304 are input to a wire capacitance model 308. From parameter values 302 and 304 and wire capacitance model 308, and using Monte Carlo simulations 310, the nominal, the standard deviation, and the histogram of wire capacitance are obtained at 312. From the standard deviation $\sigma_R$ and the histogram of wire resistance 312, the process limits at three standard deviations from the nominal resistance in the positive and negative directions may be calculated, providing the minimum resistance and maximum resistance 316. Likewise, from the standard deviation $\sigma_C$ and the histogram of capacitance values 314, the process limits at three standard deviations from the nominal capacitance in the positive and negative directions may be calculated, providing the minimum capacitance and maximum capacitance 318.

Referring now to FIG. 4, a sample histogram for resistance block diagram 400 as produced by a Monte Carlo simulation is depicted according to at least one embodiment. The minimum resistance 402 is set three standard deviations (3σ) in the negative direction from the nominal point 404. The maximum resistance 406 is set at three standard deviations in the positive direction from nominal point 404, such that the area between the minimum 402 and maximum 406 describes a 6σ range, and the number of data points smaller than 3-sigma lower limit is equal to the number of data points larger than 3-sigma upper limit. The x-axis, in this example, is resistance, while the y-axis represents the number of occurrences of such resistance plotted by the Monte Carlo simulation.

It may be appreciated that FIGS. 2-4 provide only an illustration of one implementation and do not imply any limitations with regard to how different embodiments may be implemented. Many modifications to the depicted environments may be made based on design and implementation requirements. As an example, while the exemplary embodiment referenced herein contemplates the nominal point, any process point may be substituted for the nominal point, such as the fast process point or the slow process point.

Figure 5:
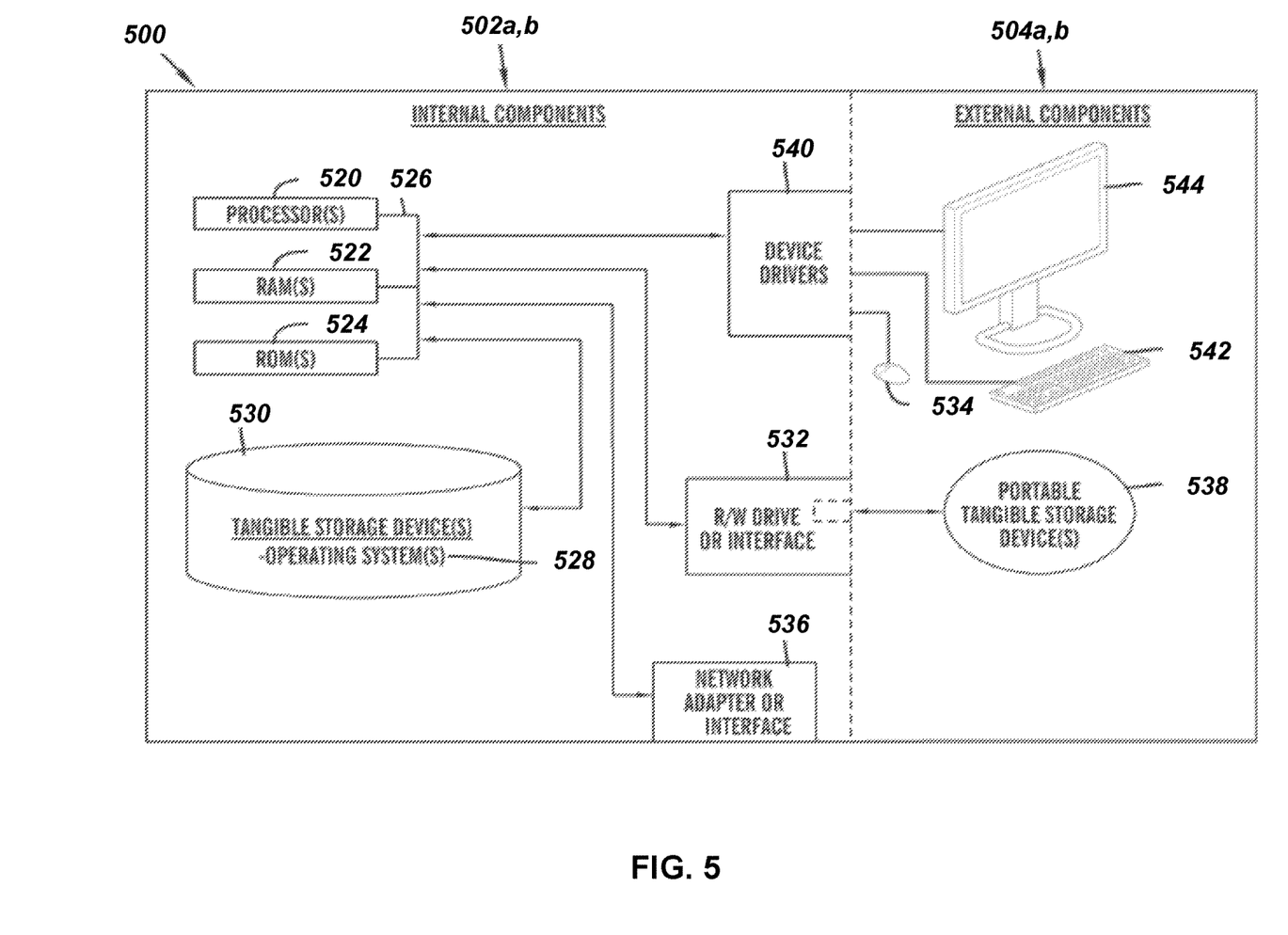
FIG. 5 is a block diagram of internal and external components of computers and servers depicted in FIG. 1 according to at least one embodiment.

FIG. 5 is a block diagram 500 of internal and external components of the client computing device 102 and the server 118 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 118 may include respective sets of internal components 502a,b and external components 504a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the parasitic extractor 108, the timing engine 112, and the parameter creation program 110A in the client computing device 102, and the parameter creation program 110B in the server 118 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 538, read via the respective R/W drive or interface 532, and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The parasitic extractor 108, the timing engine 112, and the parameter creation program 110A in the client computing device 102 and the parameter creation program 110B in the server 118 can be downloaded to the client computing device 102 and the server 118 from an external computer via a network (for example, the Internet, a local area network or other, wide area network) and respective network adapters or interfaces 336. From the network adapters or interfaces 536, the parasitic extractor 108, the timing engine 112, and the parameter creation program 110A in the client computing device 102 and the parameter creation program 110B in the server 118 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
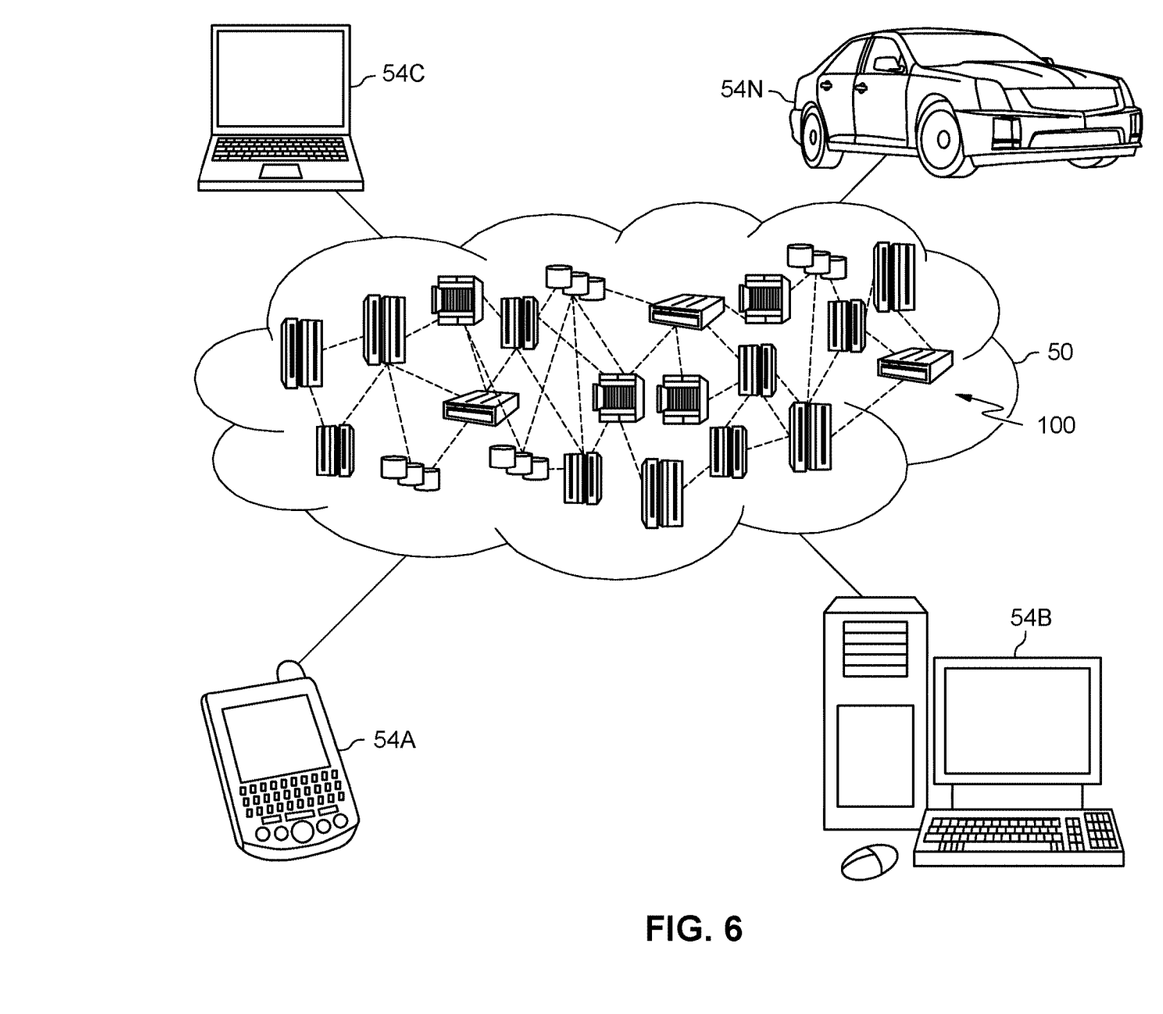
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
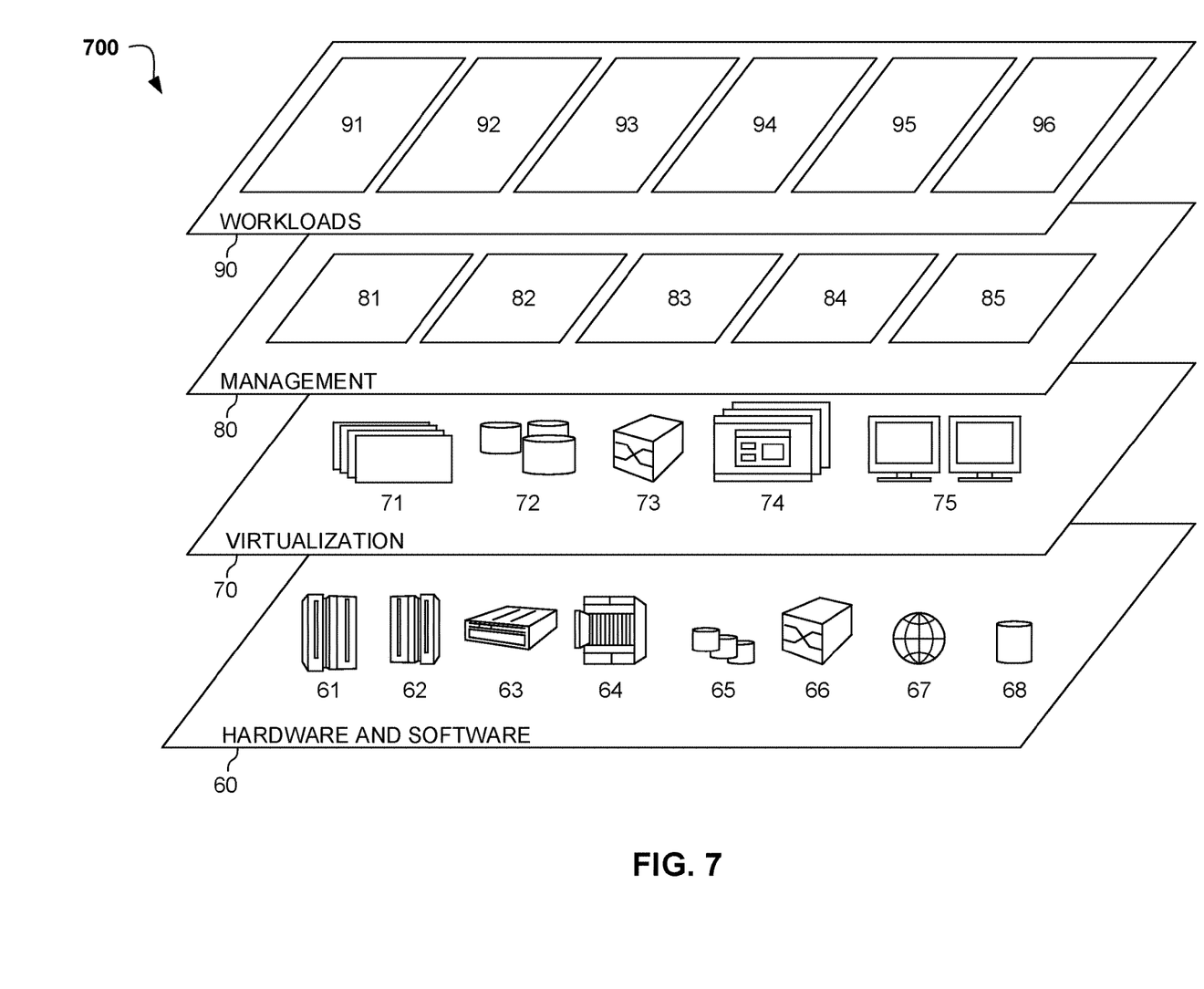
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and process parameter creation 96. Process parameter creation 96 may relate to abstracting the variational parameters down to a single input through a single parasitic extraction step utilizing Monte Carlo simulations to create per layer resistive and capacitive scalars, and use these scalars in a timing engine to compute the delay.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for creating a plurality of process parameters in a circuit design, the method comprising:
    determining a delay variability for one or more layers of a circuit based on one or more timing analyses performed using at least two delay corners, wherein the at least two delay corners are based on a plurality of scalars that scale at least one of a defined nominal resistance value and a defined nominal capacitance value to a minimum process limit and a maximum process limit, and wherein at least a first delay corner simulates a delay variability at a maximum capacitance and a minimum resistance, and wherein at least a second delay corner simulates a delay variability at a minimum capacitance and a maximum resistance.

2. A method of claim 1, wherein the at least two delay corners are comprised of a thick corner and a thin corner.

3. A method of claim 2, wherein the thick corner simulates the delay variability at a maximum capacitance and a minimum resistance, and wherein the thin corner simulates the delay at a minimum capacitance and a maximum resistance.

4. A method of claim 1, wherein the defined nominal resistance value and the defined nominal capacitance value are based on a plurality of distributions of capacitance and resistance for the one or more layers of the circuit.

5. A method of claim 1, wherein the one or more timing analyses are selected from a group consisting of a multi-corner timing analysis and a static statistical timing analysis.

6. A method of claim 1, wherein both the nominal capacitance value and the nominal resistance value are instead selected from a group consisting of a fast process and a slow process.

7. A computer system for creating a plurality of process parameters in a circuit design, the computer system comprising:
    one or more processors, one or more computer-readable memories, one or more non-transitory computer-readable tangible storage medium, and program instructions stored on at least one of the one or more non-transitory tangible storage medium for execution by at least one of the one or more processors via at least one of the one or more memories, wherein the computer system is capable of performing a method comprising the steps of:
        determining a delay variability for one or more layers of a circuit based on one or more timing analyses performed using at least two delay corners, wherein the at least two delay corners are based on a plurality of scalars that scale at least one of a defined nominal resistance value and a defined nominal capacitance value to a minimum process limit and a maximum process limit, and wherein at least a first delay corner simulates a delay variability at a maximum capacitance and a minimum resistance, and wherein at least a second delay corner simulates a delay variability at a minimum capacitance and a maximum resistance.

8. A computer system of claim 7, wherein the at least two delay corners are comprised of a thick corner and a thin corner.

9. A computer system of claim 8, wherein the thick corner simulates the delay variability at a maximum capacitance and a minimum resistance, and wherein the thin corner simulates the delay at a minimum capacitance and a maximum resistance.

10. A computer system of claim 7, wherein the defined nominal resistance value and the defined nominal capacitance value are based on a plurality of distributions of capacitance and resistance for the one or more layers of the circuit.

11. A computer system of claim 7, wherein the one or more timing analyses are selected from a group consisting of a multi-corner timing analysis and a static statistical timing analysis.

12. A computer system of claim 7, wherein both the nominal capacitance value and the nominal resistance value are instead selected from a group consisting of a fast process and a slow process.

13. A computer program product for creating a plurality of process parameters in a circuit design, the computer program product comprising:
    one or more computer-readable non-transitory tangible storage medium and program instructions stored on at least one of the one or more non-transitory tangible storage medium, the program instructions executable by a processor, the program instructions comprising the steps of:

determining a delay variability for one or more layers of a circuit based on one or more timing analyses performed using at least two delay corners, wherein the at least two delay corners are based on a plurality of scalars that scale at least one of a defined nominal resistance value and a defined nominal capacitance value to a minimum process limit and a maximum process limit, and wherein at least a first delay corner simulates a delay variability at a maximum capacitance and a minimum resistance, and wherein at least a second delay corner simulates a delay variability at a minimum capacitance and a maximum resistance.

14. A computer program product of claim 13, wherein the at least two delay corners are comprised of a thick corner and a thin corner.

15. A computer program product of claim 14, wherein the thick corner simulates the delay variability at a maximum capacitance and a minimum resistance, and wherein the thin corner simulates the delay at a minimum capacitance and a maximum resistance.

16. A computer program product of claim 13, wherein the defined nominal resistance value and the defined nominal capacitance value are based on a plurality of distributions of capacitance and resistance for the one or more layers of the circuit.

17. A computer program product of claim 13, wherein the one or more timing analyses are selected from a group consisting of a multi-corner timing analysis and a static statistical timing analysis.

\* \* \* \* \*